United States Patent [19]
Johnson

[11] Patent Number: 6,138,329
[45] Date of Patent: Oct. 31, 2000

[54] FASTENER ASSEMBLY, FASTENER TAPE MATERIAL, BAG UTILIZING FASTENER TAPE MATERIAL, AND METHOD OF MANUFACTURE THEREOF

[75] Inventor: James R. Johnson, Chamblee, Ga.

[73] Assignee: Illinois Tool Works Inc., Glenview, Ill.

[21] Appl. No.: 09/116,087

[22] Filed: Jul. 15, 1998

Related U.S. Application Data

[60] Provisional application No. 60/036,186, Jan. 18, 1997, and provisional application No. 60/035,051, Jan. 22, 1997.

[51] Int. Cl.[7] .......................... B65D 33/16; B65D 33/24
[52] U.S. Cl. ............................................ 24/587; 383/63
[58] Field of Search ................................ 383/61, 63, 66; 24/576, 578, 587, 588

[56] References Cited

U.S. PATENT DOCUMENTS

| | | | |
|---|---|---|---|
| 4,246,288 | 1/1981 | Sanborn, Jr. | 383/63 X |
| 4,428,788 | 1/1984 | Kamp | 383/63 X |
| 4,528,224 | 7/1985 | Ausnit | 383/63 X |
| 4,907,321 | 3/1990 | Williams | 383/63 X |
| 4,909,017 | 3/1990 | McMahon et al. | 383/63 X |
| 4,993,844 | 2/1991 | Robinson et al. | 383/63 X |
| 5,071,689 | 12/1991 | Tilman | 383/63 X |
| 5,461,845 | 10/1995 | Yeager | 383/66 X |
| 5,509,734 | 4/1996 | Ausnit | 383/383 |
| 5,540,500 | 7/1996 | Tanaka | 383/63 X |
| 5,601,368 | 2/1997 | Bodolay et al. | 383/63 X |
| 5,729,876 | 3/1998 | Johnson | 383/63 X |
| 5,806,984 | 9/1998 | Yeager | 383/66 X |
| 5,829,884 | 11/1998 | Yeager | 383/66 X |
| 5,902,047 | 5/1999 | Yeager | 383/66 X |

FOREIGN PATENT DOCUMENTS

| | | | |
|---|---|---|---|
| 528721 | 2/1993 | European Pat. Off. | 383/63 |
| 2117351 | 10/1983 | United Kingdom | 383/63 |

*Primary Examiner*—Jes F. Pascua
*Attorney, Agent, or Firm*—Pitney, Hardin, Kipp & Szuch LLP

[57] ABSTRACT

The present invention includes methods, an apparatus and a system in which reclosable bags and components thereof are formed. The reclosable bags are made from base web material that has transversely applied fastener tape segments thereon. The web material is used in a vertical form, fill and seal bag forming method. The method includes the steps of supplying a continuous strip of tape, having first and second closure elements sealed thereon. The first and second closure elements have respectively a pair of male profiles and a pair of female or u-shaped elements thereon, each shaped for interlocking with the other. A thickened sealing bridge between the male elements and a second thickened sealing bridge between the female elements allows precise sealing of the fastener element to fastener tape or to the bag walls as desired. It also facilitates keeping the profiles interlocked.

20 Claims, 15 Drawing Sheets

FASTENER ASSEMBLY, FASTENER TAPE MATERIAL, BAG UTILIZING FASTENER TAPE MATERIAL, AND METHOD OF MANUFACTURE THEREOF

This application claims priority from Patent Cooperation Treaty Application Ser. No. 97/US713028 filed Jul. 24, 1997, which in turn claims priority from United States Provisional Patent Application Ser. No. 60/036,186 filed Jan. 18, 1997, and United States Provisional Patents Application Ser. No. 60/035,051 filed Jan. 22, 1997, all invented by the present inventor, James R. Johnson.

BACKGROUND OF THE INVENTION

This invention relates generally to reclosable plastic bags and in particular to fastener assemblies for such bags, tape having reclosable fasteners thereon used in the manufacture of reclosable plastic bags, the web that the bags are made from, methods related to their manufacture, and an apparatus for manufacturing reclosable bags that is more efficient and economical than conventional methods and devices.

While most packaging is done with polyethylene sheeting, or multilayer sheeting that includes a polyethylene layer, there are problems in sealing reclosable profiles to the such sheeting due to the thickness of the profiles, or the thickness of flange material that may be integral with the profile. Sealing is even more difficult when the sealant layer of the bag walls is something other than polyethylene, such as oriented polypropylene, for example, used in potato chip bags. An additional problem is to manufacture reclosable bags which would remain closed until opened by the user. The present invention provides apparati, methods and materials for sealing profiles to sheeting, and for making bags in an efficient and practical manner.

Prior art such as U.S. Pat. No. 4,909,017, McMahon disclose the delivery of a pair of interlocked, profiled fasteners transversely across a web of film, to be used in forming a plurality of bags. However, the McMahon disclosure is non-enabling in that fastener strips cannot be delivered as described therein. Also, the strip material shown, if sealed in the center, would be unstable due to the rib and groove design, which would rock. Similarly, the strip material is naturally curled from extrusion and distorted from being wound onto a spool.

There are at least two other major shortcomings of the McMahon '017 patent. The first shortcoming involves the impossibility of making commercially acceptable seals of the bag walls to the backside of each fastener in the bagger sealing jaws. The second shortcoming involves the window of registration required to seal the backside of the fastener to a finished bag wall during bagger cross sealing; known form fill seal and equipment cannot repeat the film draw down with the required accuracy.

Specifically, the McMahon '017 patent describes a pressure bar seal in the bagger sealing jaws that seals the outer bag material precisely to the backside of the fastener profile. Yet, it has been discovered, as indicated in Applicant's specification, that a pressure bar seal requires a stable and flat surface to properly seal. The irregular shape of the McMahon fastener profile makes this impossible. One requires heat, dwell time, and pressure to effect a commercially acceptable seal. Due to the irregular shape of the profile, it is impossible to get enough stable pressure to accomplish a commercially acceptable seal. The surface moves and gives unpredictably. If enough heat and pressure are applied for a sufficient dwell time to mash the base of the profile flat enough to seal, the profile hooks are softened and deformed, making it impossible to repeatedly use the completed bag for opening and reclosing. In addition, no bagger can draw with the accuracy the McMahon '017 patent requires, to place the second seal, in register, on the back side of the fastener profiles.

In U.S. Pat. No. 4,528,224, it has been known to manufacture reclosable fastener assembly in which a pair or even several pairs of male and female profiles interlock. In U.S. Pat. No. 4,528,224 by inventor Steven Ausnit, such a pair fastener has shown. In FIG. 2 of Ausnit, a pair of such profiles have flanges which extend between them. However, the flanges are the same thickness as the entire based of the profiles. Similarly, in U.S. Pat. No. 4,246,288, Sanborn, a pair of fastener profiles has flanges extended there between. However, in both cases the fastener profiles are not sufficiently separate so that the flanges extending between them are not relatively ragged but are flexible and are not supportive by the fastener profiles themselves. In U.S. Pat. No. 5,509,734 again, pairs of fastener profiles are shown. However, in the '734 patent, a wedge is located between the fastener profiles.

U.S. Pat. No. 4,993,844 discloses a complimentary interlock strip extruded with and mounted on strips of plastic material. Similarly, U.S. Pat. No. 5,071,689, discloses strips of extruded plastic zipper sections. However, none of the foresaid patents discloses sealing of reclosable fastener assembly to tape strips of tape are in return are sealed to or webs of bag making materials.

PCT application number 97/06062, published Feb. 20, 1997, discloses a zipper film and bag in which a reclosable bag has a reclosable refastener assembly connected to a single wall of the bag in which the film of the bag has a reclosable fastener connected to one side thereof which does not requires attachment to any other portion of the film when making the bag. This differs from the present invention in which the fasteners attached to both wall of the bag, either directly of intermediate tape material.

SUMMARY OF THE INVENTION

Accordingly, it is an object of the present invention to overcome the shortcomings of the prior art by providing a fastener assembly which is easier to seal to flexible film than prior art fasteners. It is an additional object of the invention to provide a fastener assembly in which thickened sealing bridges are positioned between a pair of profiles, as to facilitate sealing. It is a further object of the invention to provide a fastener assembly having opposing dual profile closure elements in which one of the male profiles has a layer head or barb, the other male profile, thereby making that side of the fastener assembly (the consumer side) harder to open so as to prevent product from inadvertently forcing the bag open. It is an additional object of the invention to utilize fastener profile mounted on tape in the bag forming process, thus sealing two flat, substantially parallel surfaces together. As a result, there is no irregular surface that is sealed to attach the fastener to the front panel, or to carry the fastener through the bagger and down the form, fill and seal tube or to seal the back-seamed side of the package.

It is an additional, object of the invention to solve the shortcomings of the art through the use of fastener tape to which the fastener assembly is attached as to provide a thin substantially flat surface which is sealed to the bag wall(s).

It is an additional object of the invention to treat the inside surface of the area to prevent area from being sealed together during the process described below, to allow zipper and bag opening from this area.

It is a further object of the invention to provide an automatic contamination-free package by sealing the fastener completely inside the package. In this variant, the top seal of the package must be cut off to allow the customer/user to get to the opening tabs of the fastener.

It is an additional object of the invention to provide a method of making a reclosable bag having a body with top and bottom ends and opposing walls in a vertical, form, fill and seal machine that includes the steps of forming the bag walls from web material having a longitudinal back seal extending between the top and bottom ends of the bag body, and transversely securing across the longitudinal back seal a tape having a flanged, interlocked fastener strip thereon. The tape is substantially wider than the width of the interlocked fastener strip attached to the flange.

It is an additional object of the invention not to contact or deform the interlocked fastener strip during the sealing process.

It is an additional object of the invention to create a commercially-acceptable seal across the longitudinal back seal of a bag while providing greater tolerance for deviations in bagger web draw.

The tape is sized and dimensioned to provide a larger window of registration than that required to seal the backside of a conventional fastener onto a finished bag wall, whether it is a back or front panel wall, directly onto the backside of the fastener during bagger cross sealing. The tape is also sized and dimensioned to provide repeatable sealing of the tape to the bag wall during the transverse bagger cross sealing process while allowing for variances and deviations in bagger web draw.

It is a further object of the invention to provide an improved vertical, form, fill and seal process that includes transversely sealing a non-profiled, stable and substantially flat surfaced appendage or flange having a profiled, interlocked, reclosable fastener strip connected thereto across the longitudinally extending back seal of a bag during bagger cross sealing. It is appreciated that the transverse sealing across the non-profiled, stable and substantially flat surfaced appendage permits one to seal the appendage to bag material with an effective heat, dwell time, and pressure to effect a commercially acceptable seal without the surface moving and giving unpredictably. It is also appreciated that greater, pressure and dwell can be applied to mash the shape flat enough to seal, while simultaneously preventing the profiled fastener from softening and deforming making it possible to repeatedly use the completed bag for opening and reclosing.

The system method, and tape assembly described above is extremely versatile. The tape or flange is substantially thin allowing its use with a greater variety of bag walls materials, regardless of the base web thickness. The tape or flange, since it is ribless and thin, blends the cross seals better, from tape plus bag wall thickness to bag wall thickness only, and results in continuous seals, sealed in the bagger sealing jaws.

Further, the assembly described above is constructed to be readily, transversely "pulled" across a web of material, and the assembly method, and system can be used with any appropriate tape base material. The invention described above can be used on laminate bag wall base web material, e.g. snack food bag wall and base web material where a user does not want to change their present structure/bag wall material, which does not easily seal to LDPE (Low Density Polyethylene) material.

The objects and features of the present invention, other than those specifically set forth above, will become apparent in the detailed description of the invention set forth below and in the drawings.

BRIEF DESCRIPTION OF THE DRAWINGS

FIG. 4 of the drawings is a vertical section of the fastener assembly of FIG. 1 showing separating force being applied to the fastener on the product side of the fastener.

DETAILED DESCRIPTION OF THE PREFERRED EMBODIMENT

Figure 1:
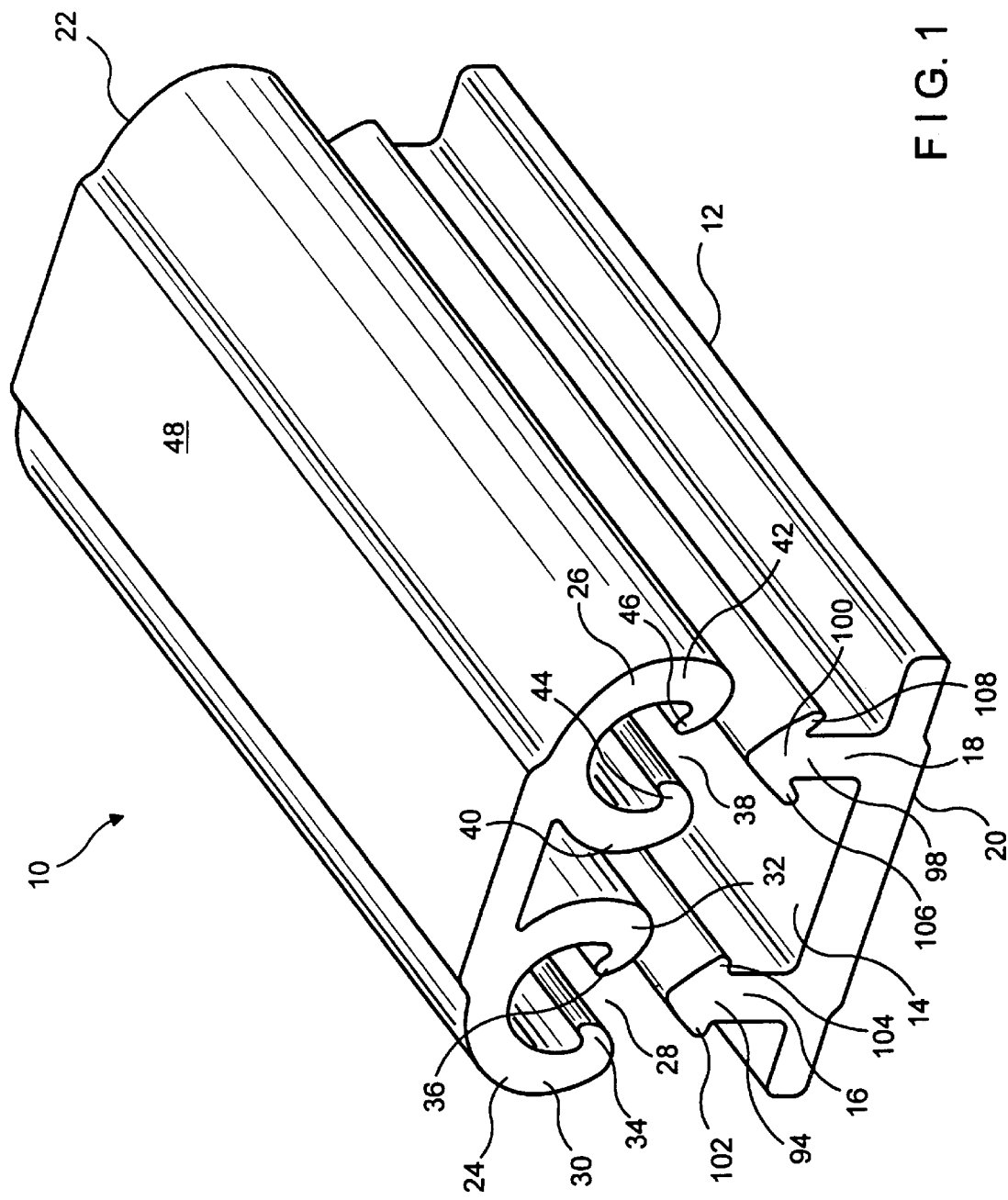
FIG. 1 of the drawings is a front perspective view of the fastener assembly of the present invention.

While the present invention is susceptible of the embodiment in many different forms, there is shown in the drawings and will herein be described in detail several specific embodiments with the understanding that the invention is not limited thereto except insofar as those who have the disclosure before them are able to make modifications and variations therein without departing from the scope of the invention.

As shown in FIG. 1 of the drawings, a reclosable fastener assembly 10 for bag making material 8 (shown in FIG. 8) is shown. Fastener assembly 10 includes a first closure element 12 having a base member 14, a first male profile 16 extending substantially perpendicularly from base member 14 and a second male profile 18 also extending substantially perpendicularly from base 14 and substantially parallel thereto. Base member 14 further includes a thickened sealing bridge 20 extending between first male profile 16 and second male profile 18.

Figure 8:
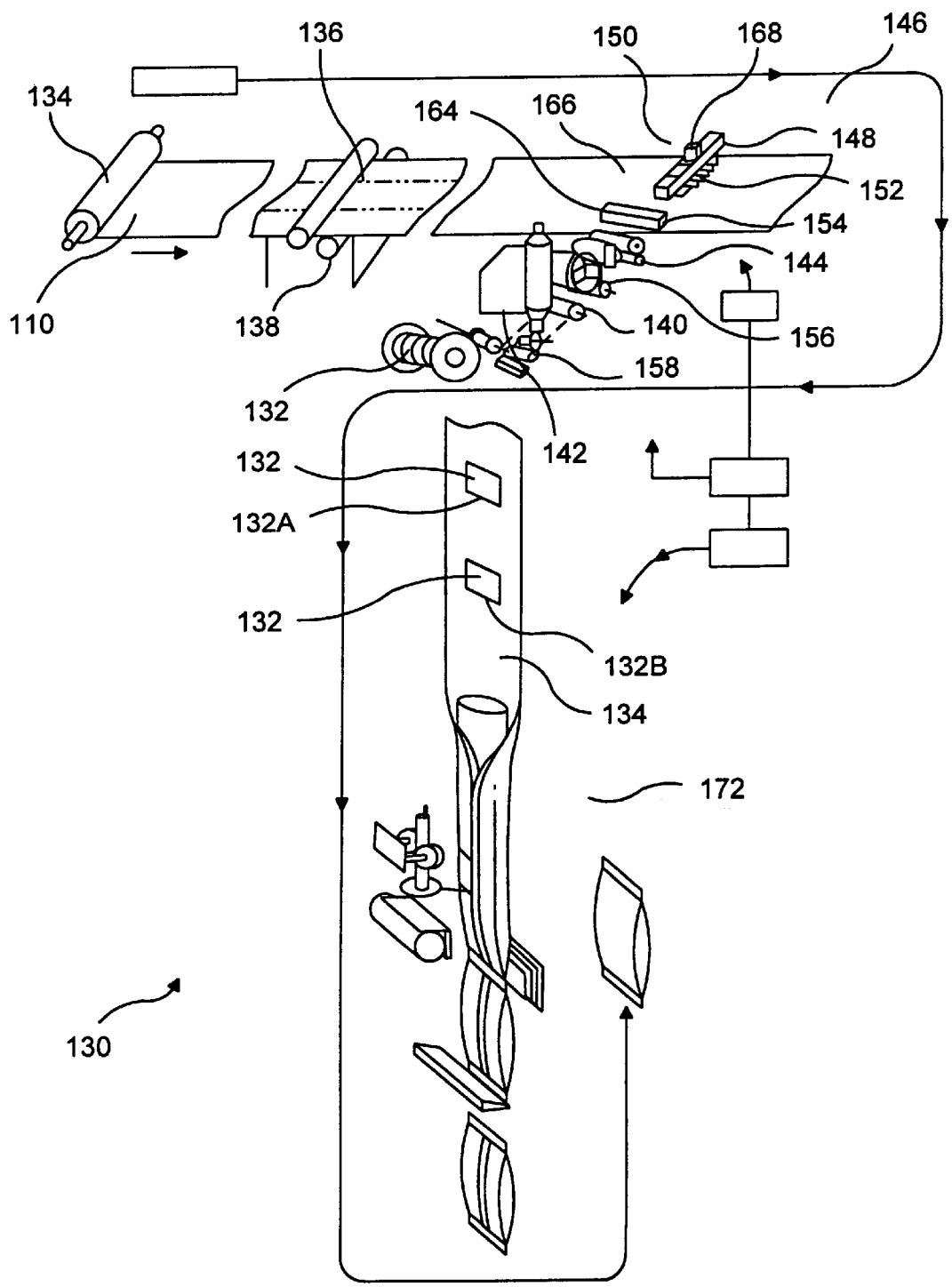
FIG. 8 of the drawings is a schematic diagram showing the system of the present invention for applying reclosable fastener assemblies to a web of bag making material and for subsequently forming the web into reclosable bags.

Fastener assembly 10 further includes a second closure element 22. Second closure element 22 includes a pair of substantially u-shaped members 24 and 26. U-shaped member 24 includes a first channel portion 28, a first leg portion 30 and a second leg portion 32. The first leg portion 30 has a first hook member 34 attached to and extending inwardly therefrom. Second leg portion 32 has a second hook member 36 attached to and extending inwardly from the distal end of second leg portion 32. The second u-shaped member 26 has a second channel portion 38, a third leg portion 40 and a fourth leg portion 42. A third hook member 44 extends inwardly from third leg member 40 and a fourth hook member 46 extends inwardly from forth leg member 42. First and second hook members 34, 36 and first and second leg members 30, 32 and channel 38 are constructed, sized, positioned and arranged for telescopic reception of first male member 16. Similarly, third and fourth hook members 44, 46 and third and forth leg members 40, 42 as well as second channel 38, are constructed and arranged for telescopic reception of and selective retention of second male member 18. A second sealing bridge 48 extends between first and second u-shaped members 24 and 26. The first and second male members 16 and 18 are constructed and arranged, sized and positioned for supporting, when interlocked with said first and second u-shaped members 24 and 26. The thickened sealing bridges 20 and 48 in parallel to each other, thereby facilitating sealing of the fastener assembly 10 to bag making material 8 (as seen in FIG. 8).

Figure 2:
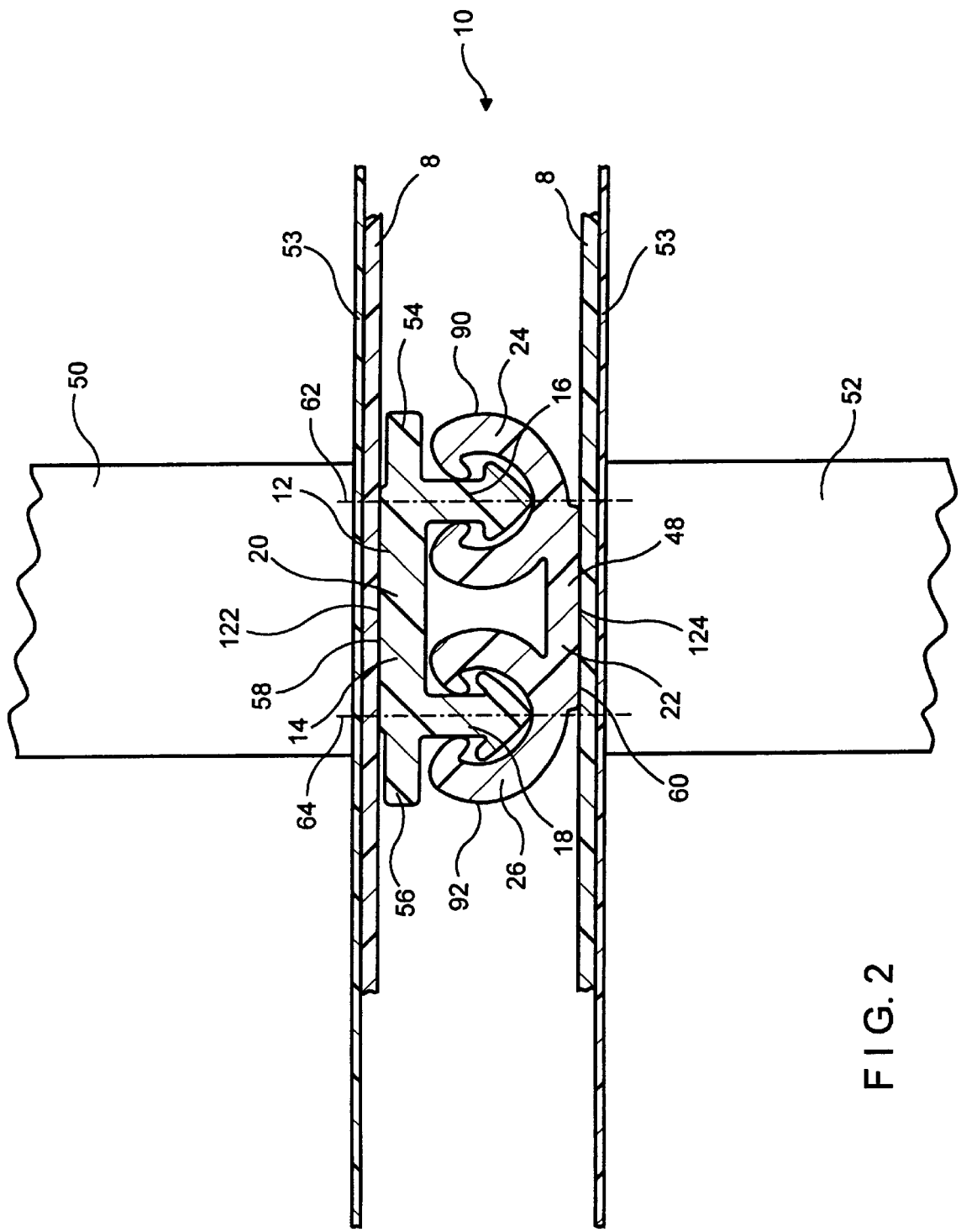
FIG. 2 of the drawings is a vertical section of the fastener assembly of FIG. 1 sealed to bag web material by a pair of sealing bars.

As seen in FIG. 2, in a preferred embodiment, reclosable fastener assembly 10 is sealed to bag making material 8. In a preferred embodiment, a pair of teflon belts 53 are disposed between the sealing bars 50 and 52 and the bag making material. The sealing bars 50 and 52 apply mild pressure against the teflon belt 53 and transfer heat through the belt 53 to the bag making material 8 and to the sealing bridges 20 and 48. The first closure element 12 and second closure element 22 are supported by the male profile members 16 and 18 and the first sealing bridge 20 and second sealing bridge 48 are substantially in parallel to each other. Thus, if the fastener elements 12 and second closure element 22 should not be centered properly, the reclosable fastener assembly 10 is still easily sealed and operates properly for selective interlocking and release as desired. In addition, it should be noted in this regard that in a preferred embodiment, thickened sealing bridge 20 has a pair of flanges 54 and 56 extending laterally therefrom, and that flanges 54 and 56 are reduced in thickness so that the first sealing bridge 20 tends to center the sealed area 58. Similarly, in the second closure element 22, u-shaped members 24 and 26 are positioned above thickened sealing bridge 48 so that second thickened sealing bridge 48 also tends to center when sealed against bag making material 8 along seal line 60. In a preferred embodiment, thickened sealing bridge 20 is approximately 0.060 inches in width and 0.010 inches in thickness ±0.003 inches. It is preferably constructed of a polyethylene blend including at least some portion of ethylene vinyl acetate to facilitate sealing. The materials are preferably a low density polyethylene such as Petrothene brand. Bag making material 8 is also preferably low density polyethylene. The system shown in FIG. 2 for sealing bag making material 53 to fastener assembly 10 already exists in model AMI-RD manufactured by AMI/Repro.

In the preferred embodiment, first male profile 16 and second male profile 18 extend approximately 0.047 inches from base member 14 ±0.003 inches and first and second male members 16 and 18 are approximately 0.066 inches separate from each other ±0.003 inches taken along the central axis 62 and 64 of respectively first male profile 16 and second male profile 18. Similarly, u-shaped members 24 and 26 and second closure element 22 are approximately 0.036 inches in height from base member 48 and are separated by a distance of approximately 0.067 inches ±0.003 taken along the central axis 62 and 64 of each of the u-shaped members 24 and 26.

Figure 2A:
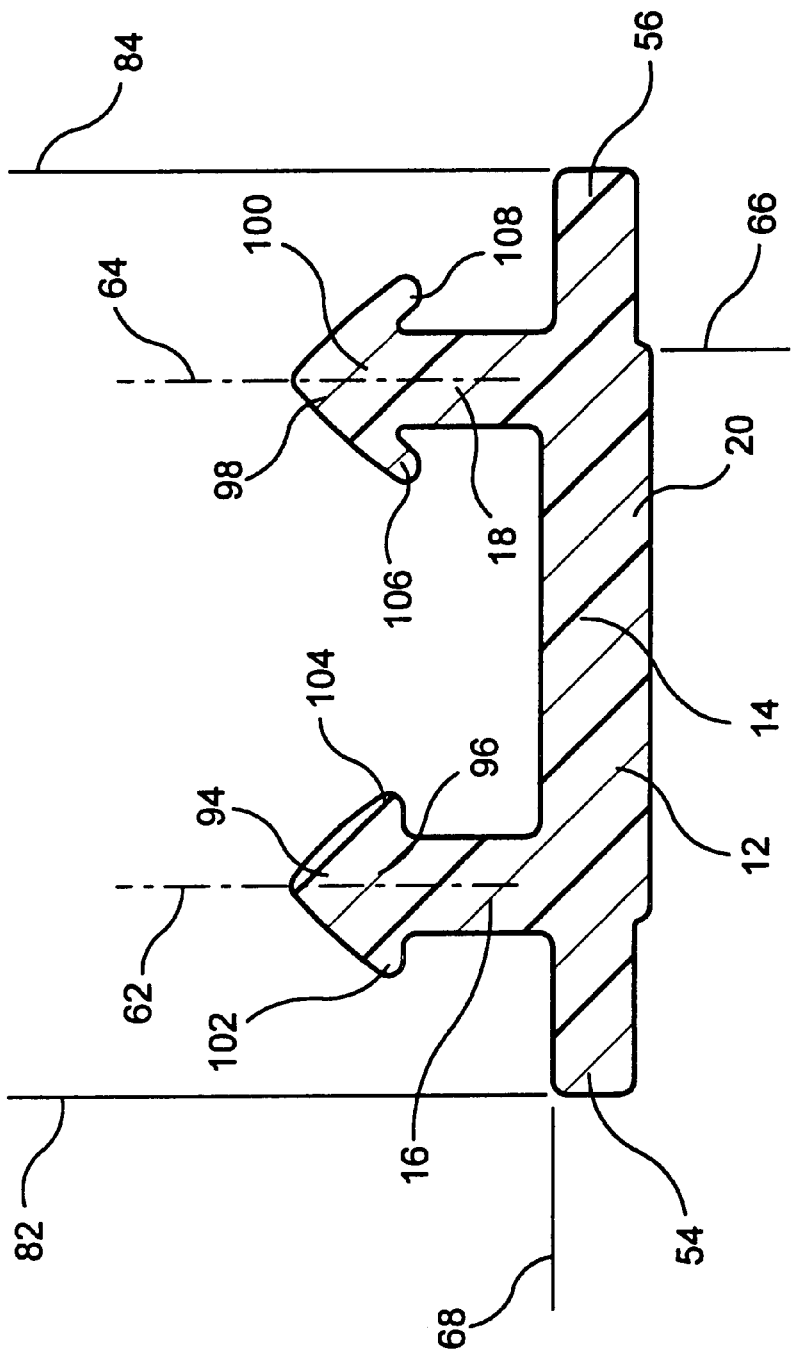
FIG. 2A is a vertical section of the first closure element of the fastener assembly of FIG. 2.
Figure 2B:
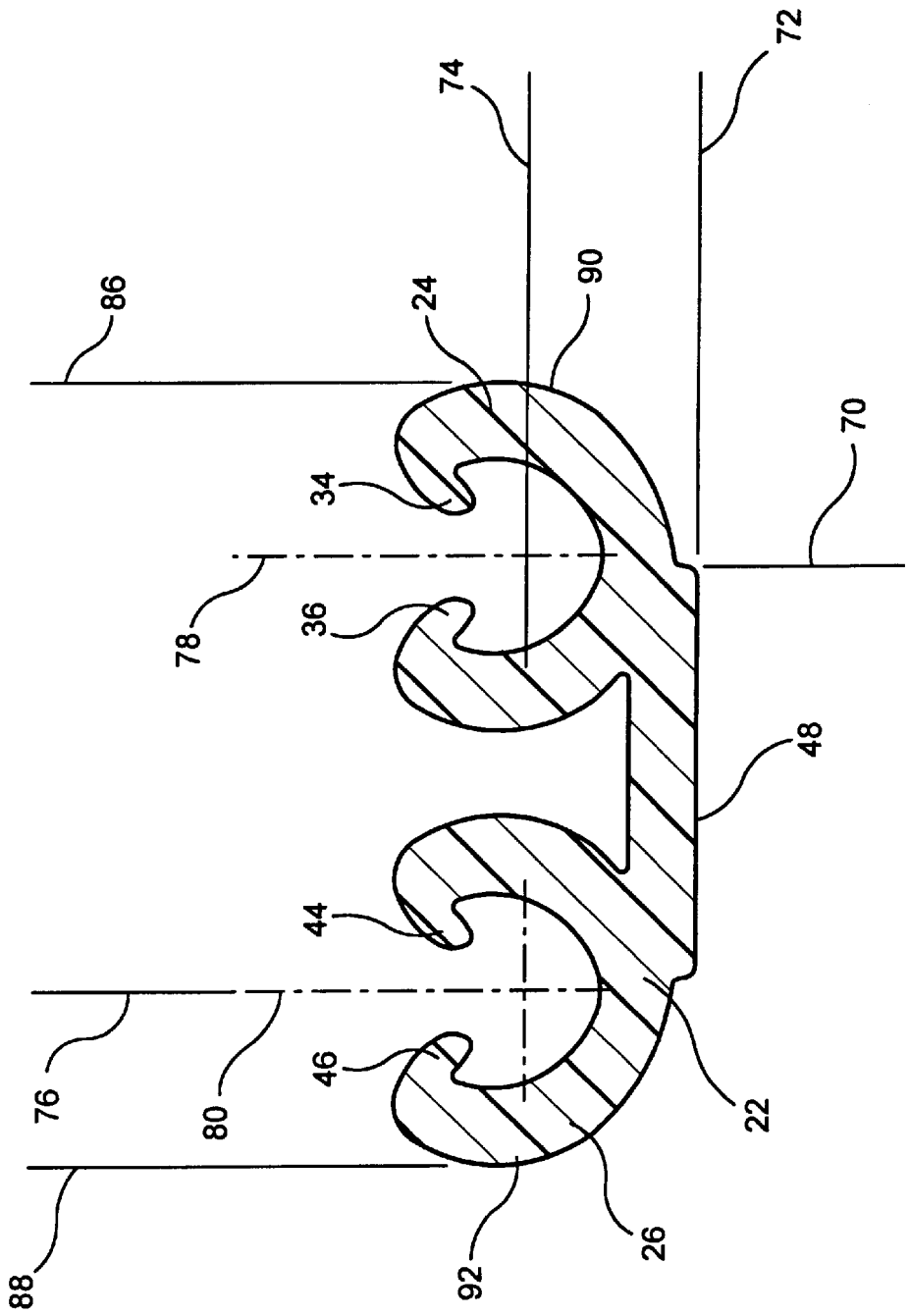
FIG. 2B is a vertical section of the second closure element of the fastener assembly of FIG. 2.

As shown in FIG. 2A, thickened sealing bridge 20 of first closure element 12 is approximately 0.070 inches in width measured at line 66 and is approximately 0.14 inches in thickness measured at line 68. As shown in FIG. 2B, thickened sealing bridge 48 of second closure element 22 is approximately 0.060 inches in width as shown at line 70 and is approximately 0.010 inches in thickness ±0.003 as shown at line 72. As further shown in FIG. 2A, first male profile 16 and second male profile 18 extend approximately 0.047 inches from the outside of the base member 14 and the first and second male members 16 and 18 are approximately 0.066 inches ±0.003 inches separated from each taken along the central axis 62 and 64, respectively of each of the male members 16 and 18. Similarly, as shown in FIG. 2B, substantially u-shaped members 24 and 26 are approximately 0.046 inches ±0.003 in height as seen at line 74 and are separated by a distance of approximately 0.067 inches ±0.003 as seen at line 76 taken between the central axis 78, 80 of each of the u-shaped members 24 and 26, respectively.

As further seen in FIGS. 2A and 2B, first closure element 12 and second closure element 22 are approximately 0.12 inches in width when used on thin film as seen at the distance between lines 82 and 84 in FIG. 2A and between lines 86 and 88 in FIG. 2B.

Returning to FIG. 2, when first closure element 12 and second closure element 22 are interlocked, they form a substantially rectangular strip and cross section which may be easily guided through bag making equipment 172 (FIG. 8). In particular, in bag making equipment 172 has rectangular slots, grooves or rectangular openings therethrough, sided to contain reclosable fastener assembly 10 and to guide the interlocked fastener assembly 10 in precisely aligned vertical and horizontal position and maintain an interlocked configuration. To this end, u-shaped members 24 and 26 include curved, lateral edges 90, 92 which are constructed and arranged, sized and positioned for facilitating guidance of the second closure element 22 through the aforesaid slots or grooves (not shown) in bag making equipment 172. In order to further facilitate passage of reclosable fastener assembly 10 through bag making equipment, lateral flanges 54 and 56 extend outwardly to the same dimension as the curved lateral edges 90 and 92, thus providing a substantially rectangular configuration. The remaining sides of the rectangle are formed by thickened sealing bridges 20 and 48.

As further seen in FIGS. 1 through 7, first male profile 16 includes a barb member 94 formed on the distal end 96 of the first male profile 16. Similarly, the second male profile 18 has a barb 98 integrally formed on the distal end 100 of the second male profile 18. The first and second barb members 94 and 98 are constructed, sized and arranged for selective interlocking with the u-shaped closure members 24 and 26, respectively.

Figure 3:
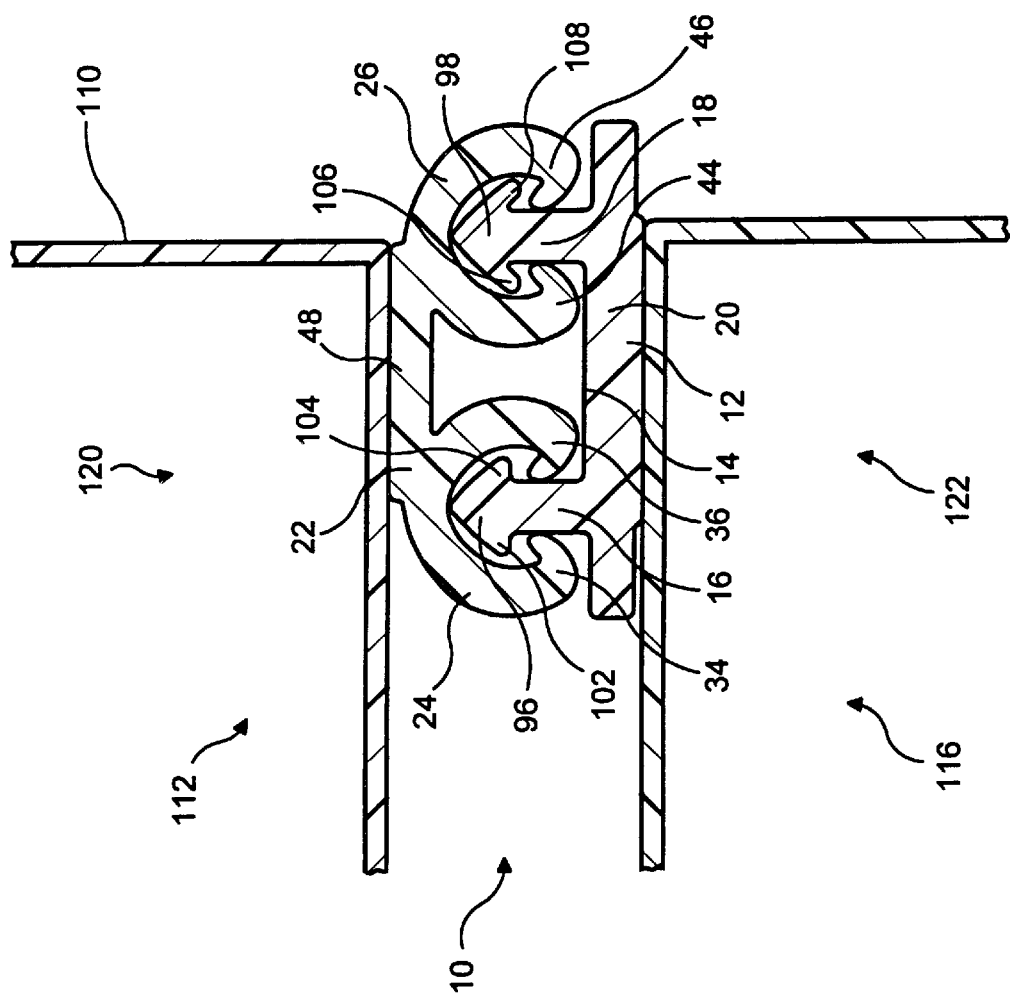
FIG. 3 is a vertical section of the fastener assembly of FIG. 2 shown with the consumer side bag web material extending vertically.
Figure 4:
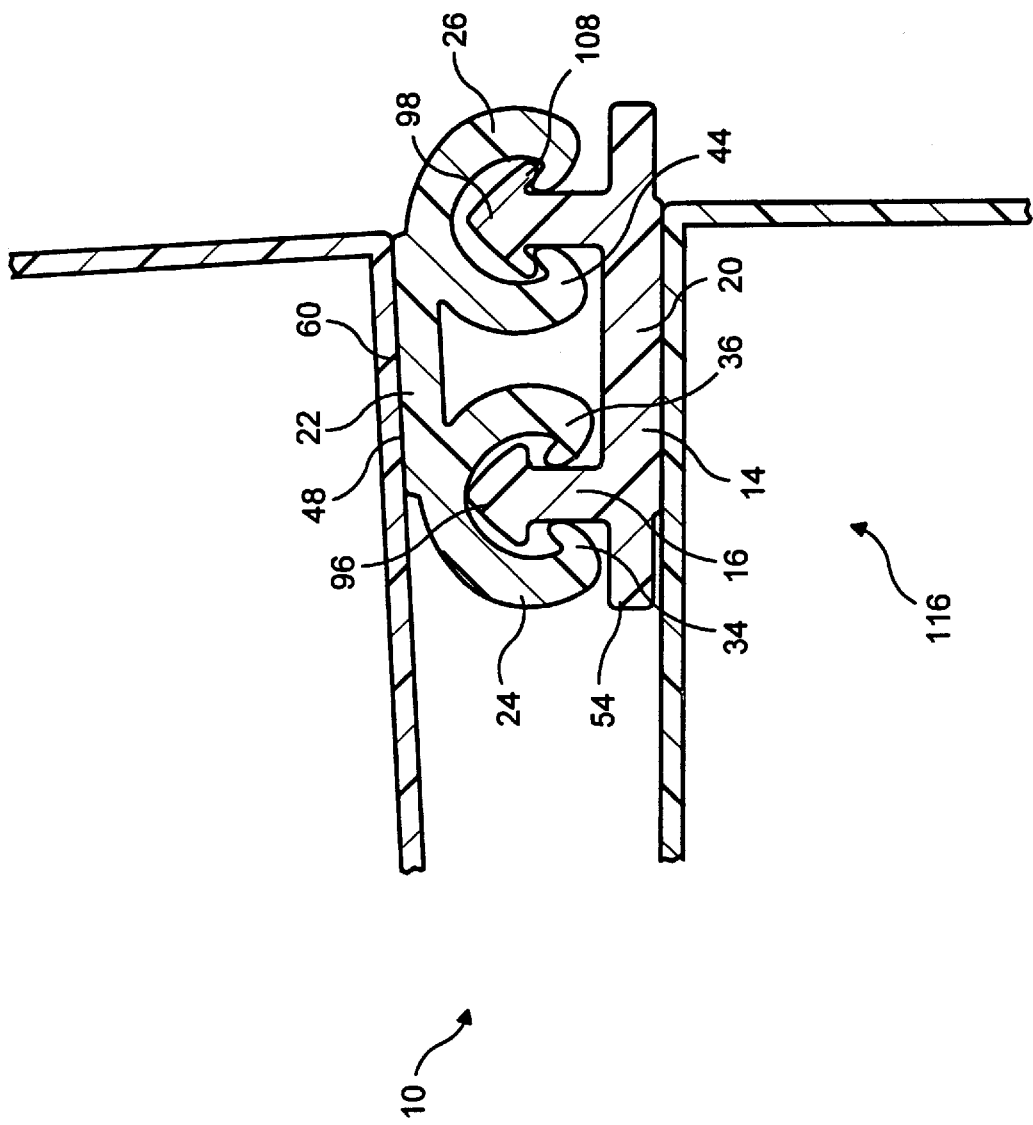
FIG. 4 is a vertical section of the fastener assembly of FIG. 2 shown with the product side bag web material extending vertically.
Figure 5:
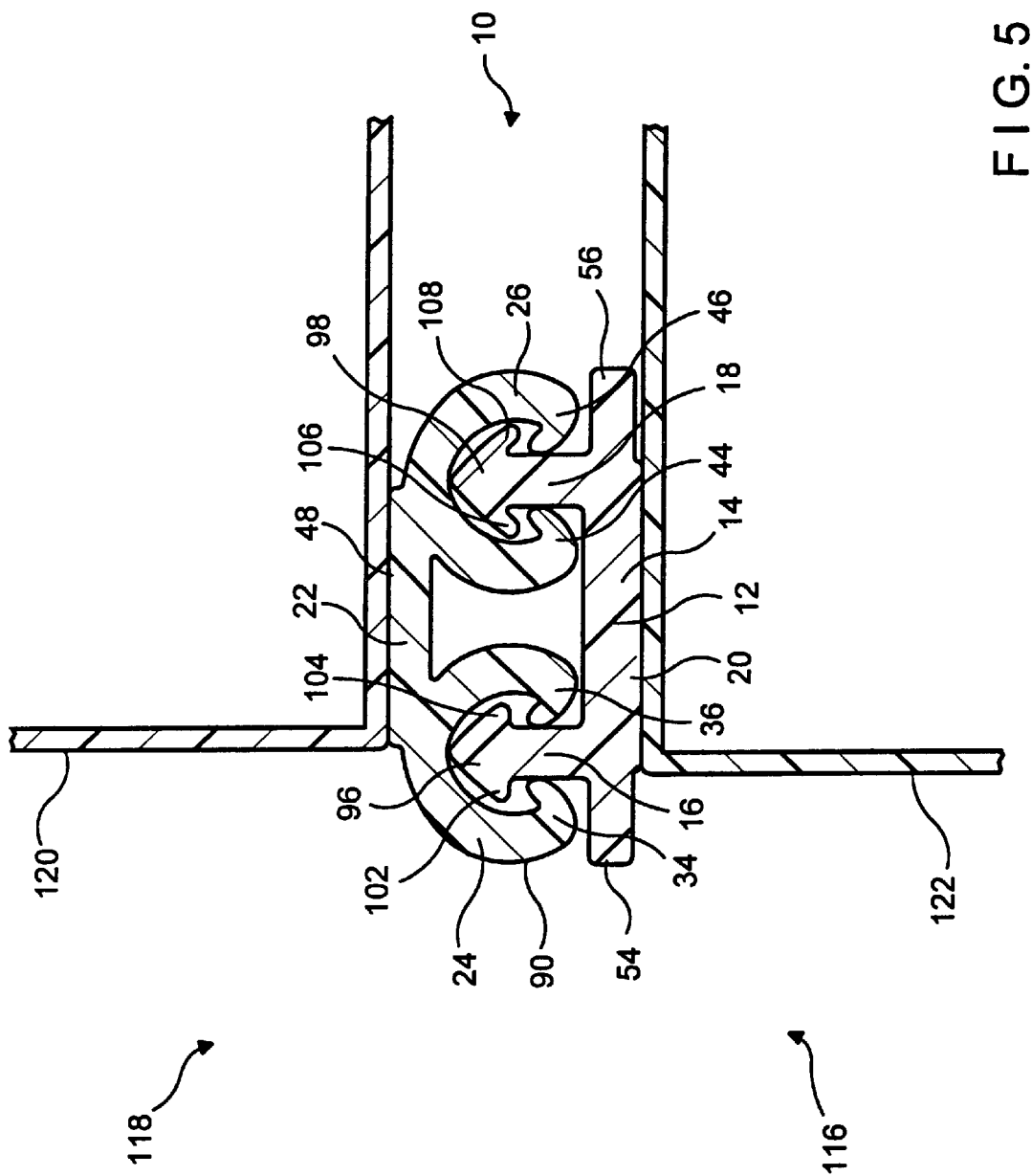
FIGS. 5, 6 and 7 are vertical sections of the fastener assembly of FIG. 1 showing a separating force being applied to the fastener on the consumer side of the fastener so as to cause it to open.
Figure 6:
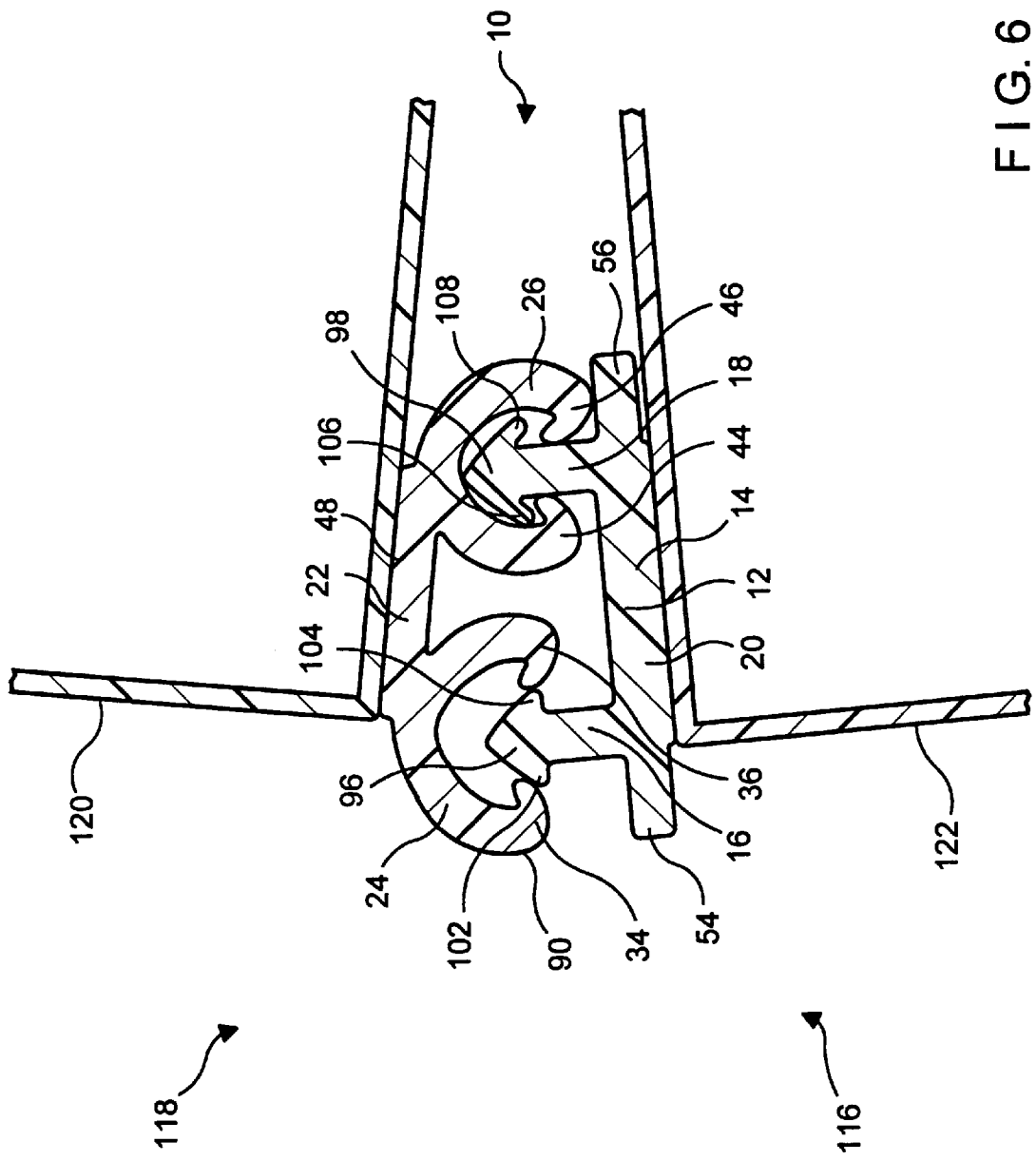
Figure 7:
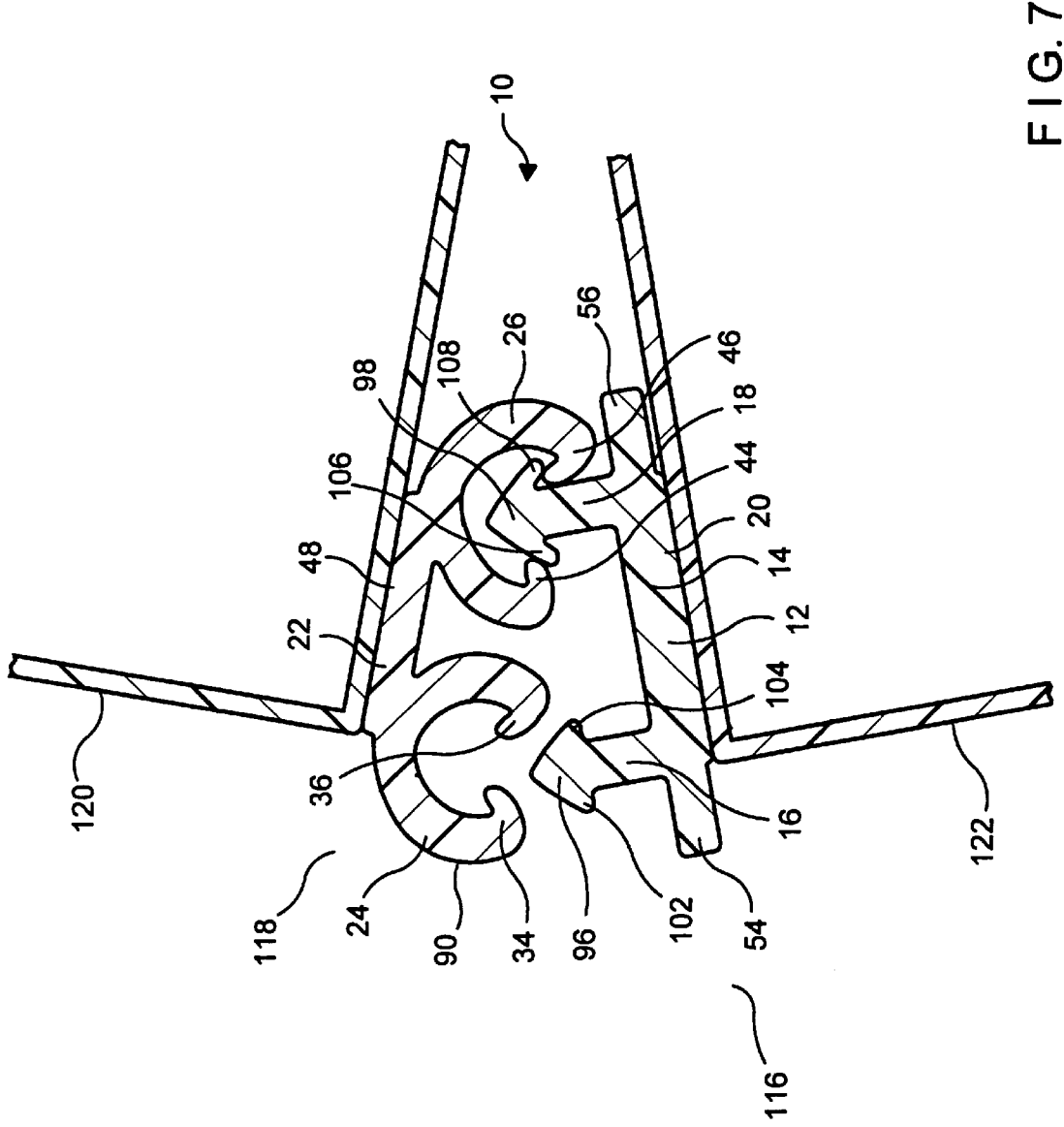

As further seen in FIGS. 1 through 7, first barb member 16 has a pair of prongs 102 and 104 extending substantially laterally therefrom adapted for interlocking with first and second hook members 34 and 36 of first u-shaped member 24. Similarly, second barb member 98 has third and fourth prongs 106 and 108 extending laterally from first male member 18 which are adapted for selective interlocking with third and fourth hook members 44 and 46 on second u-shaped member 26. In a preferred embodiment, third and fourth prong members 106 and 108 are larger than first and second prong members 102 and 104 so that second male member 18 when interlocked with second u-shaped member 26 is more difficult to separate from the second u-shaped member 26 than first male member 16, when interlocked with first u-shaped member 22. As a result, as best seen in FIGS. 3 through 7, when reclosable fastener assembly 10 is disposed horizontally across a bag 110 and near the top 112 of bag 110, it is preferable when contents 114 within bag 110 push against fastener assembly 10 for bag 110 not to open, even when shaken or turned upside down. Accordingly, as seen in FIGS. 3 and 4, second male member 18 and second u-shaped member 26 are disposed on the product side 116 of the bag 110. By this it is meant that they are disposed proximate the inside of the bag 110 rather than proximate the top 112 of the bag 110. As seen in FIGS. 5 through 7, when force is applied to separate reclosable fastener assembly from the consumer or exterior side of the bag 110, since barbs 102, 104 are smaller than barbs 106, 108, it is relatively easy to separate the top side 120 of bag making material 8 from the bottom side 122.

The precise amount of force required to open reclosable fastener assembly 10 can be controlled by increasing or decreasing the size of barbs 94 and 98 and/or increasing or decreasing the size of hooks 34, 36, 44, and 46. However, this must be controlled within limits so that it is neither impossible to open the reclosable fastener assembly 10 nor is it too easy to open. In this regard, in a preferred embodiment, first and second prongs 102 and 104 extend laterally; i.e., substantially perpendicularly from first male member 16. Third and forth prongs 106, 108, however, extend at a 45 degree angle from second barb member 98, i.e., from second male member 18. In a preferred embodiment, first channel 28 has an interior radius of 0.015 inches ±0.003. Similarly, second channel 38 has a similar interior radius of 0.015 inches ±0.003. First hook 34 and second hook 36 have a radius on their ends of 0.002 inches as do third and fourth hooks 44 and 46. However, third and fourth hooks 44 and 46 may be slightly larger in order to further restrain second barb member 98, as required.

Figure 10:
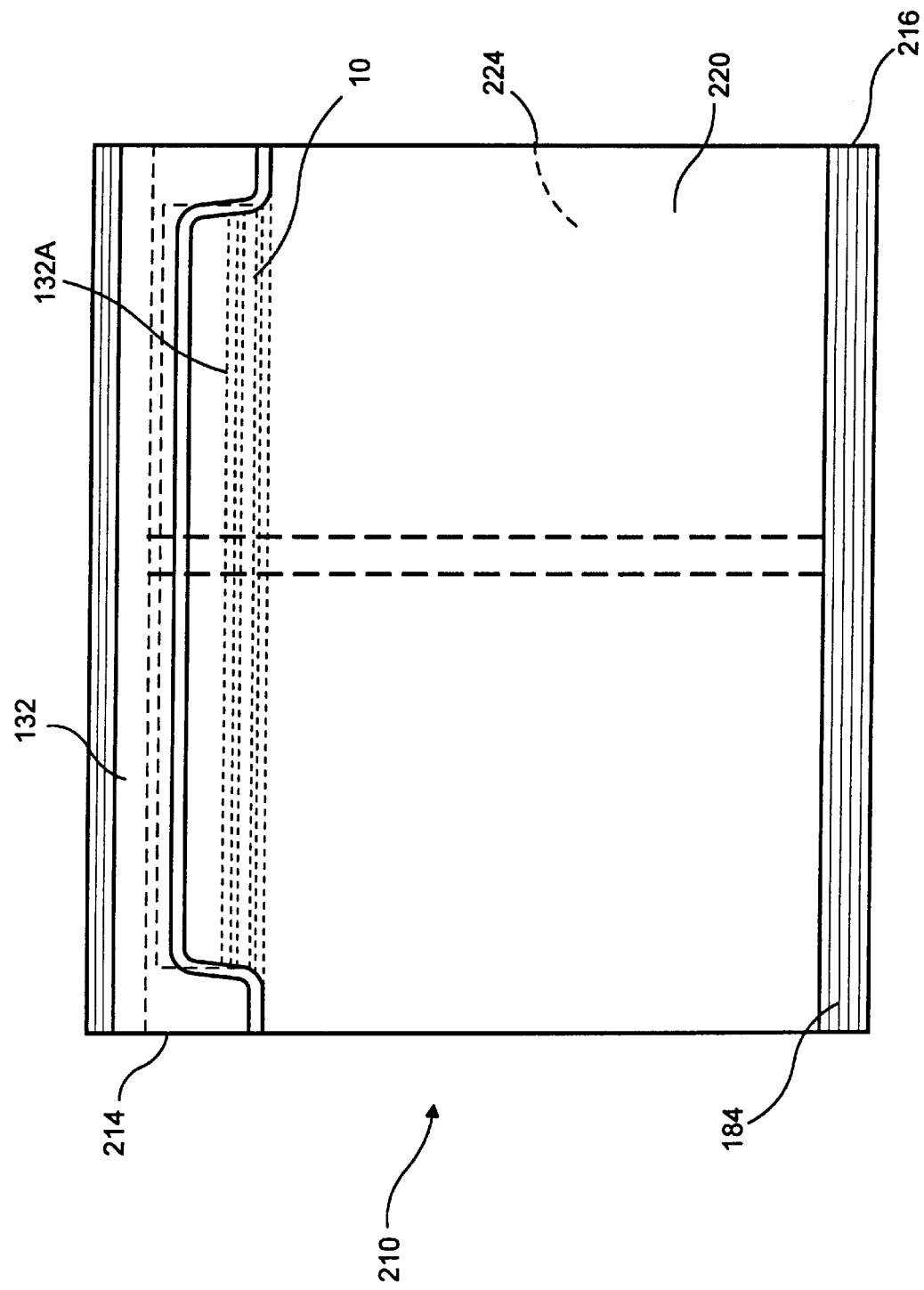
FIG. 10 of the drawings is a front elevation of a bag having the reclosable fastener of the present invention.

As seen in FIGS. 5, 6 and 7, when first male assembly 16 is separated from first u-shaped member 24, second male profile 18 and second u-shaped member 26 remain at least partially interlocked, thereby serving as a secondary seal for reclosable fastener assembly 10, when used in the manufacture of a bag 110, as such as that shown in FIG. 10. Similarly, in FIG. 10, when product within bag 110 presses against reclosable fastener assembly 10 from the product side 116, as has been described previously, since barb 98 is larger in size than barb 94, more force is required to open reclosable fastener assembly 10 from the consumer side 118. In the event that the product should force apart second u-shaped member 26 and second male profile 18, first male profile 16 and first u-shaped member 24 remain at least partially interlocked, thereby providing a secondary seal of the bag 110.

As further seen in FIGS. 3 through 7, thickened sealing bridge 20 is sufficiently flexible to allow opening of reclosable fastener assembly 10, while at the same time is sufficiently rigid to permit and facilitate sealing of the thickened sealing bridge 22 with the reclosable bag making material 8. In this regard, male profiles 16 and 18 are sufficiently rigid to maintain interlocking with u-shaped closures 24 and 26 while at the same time being sufficiently flexible to allow selective manual opening of fastener assembly 10, as required by the user. Similarly, u-shaped members 24 and 26 are sufficiently rigid to maintain fastener assembly 10 in an interlocked configuration, while at the same time sufficiently flexible so as to allow separation of legs 30, 32, 40, and 42 so as to allow barbs 94 and 98 to be released from hooks 34, 36, 44, and 46. In order to adjust the degree of stiffness of legs 30, 32, 40, and 42, legs can be increased in thickness during molding, preferably by extrusion during manufacture, to create a stiffer leg and therefor one which is more difficult to move, thereby requiring greater opening force. Conversely, the legs 30, 32, 40 and 42 can be thinner. Similarly, hooks 34, 36, 44, and 46 can be thickened or thinned, during the extrusion process to increase or decrease the force required to separate from barbs 94 and 98, respectively. In addition, hook 36 can be made larger in size than hook 34, and hook 44 be made larger in size or of a greater angle than hook 46, thereby increasing the opening force for opening from the product side 116 of the bag 110 rather than the consumer side 118.

As noted previously, barb 98 is larger in size than barb 94 and prongs 106, 108 are angled downwardly at a 45 degree angle so as to increase interlocking force with hook members 44 and 46 whereby finished bags 110 manufactured from fastener assembly 10 and bag making material 8 are more difficult to open on the product side 116 than on the consumer side 118 when fastener assembly 10 is sealed on bag making material 8 and interlocked in a bag 110. In this regard, in a preferred embodiment, male profile members 16 and 18 are approximately 0.014 inches in width ±0.003.

As mentioned previously, fastener assembly 10 is constructed of a Petrothene low density polyethylene blend containing a percentage of ethylene vinyl acetate. The ethylene vinyl acetate, or "EVA" allows increased flexibility as well as reducing the sealing temperature required for sealing thickened sealing bridges 20 and 48 to bag making material 8. Similarly, in a preferred embodiment, u-shaped members 24 and 26 are approximately 0.054 inches in width and have an interior diameter approximately 0.015 inches ±0.003 and again are constructed of Petrothene low density polyethylene blend, although other materials may be used. As a result of the choice of these materials, the size of the various elements of the fastener assembly 10 and their configuration, the sealing bridges 14 and 48 are sufficiently thin to allow sealing to bag making material 8 as shown in FIG. 2, at a rate of at least 60 fastener assemblies per minute, while at the same time being sufficiently thick to rigidly support the male profile members 16 and 18 and the u-shaped closure members 24 and 26 so as to facilitate and maintain interlocking of the first closure element 12 with the second closure element 22, as required. Again, as shown in FIG. 2, due to the configuration of fastener assembly 10, sealing may be accomplished substantially in the center 122 of sealing bridge 20, along seal 58. Seal 58 is located substantially between access 62 and 64 of first male profile 16 and second male profile 18. Similarly, seal 60 is located at the center 124 between center lines 62 and 64 of first u-shaped member 24 and second u-shaped member 26. Thus, a substantially stable supported surface is provided for sealing between thickened sealing bridge 20 and bag making material 53 and second thickened sealing bridge 48 and bag making material 8.

FIG. 8 is a schematic representation of system 130 of the present invention for dispensing and sealing tape 132 having fastener assembly 10 thereon to web 134. The proper feeding, locating and sealing tape 132 at predetermined locations on base web 110 are important aspects of system 130. System 130 is capable of reliably performing with high throughput and with low cycle times. The manner in which tape 132 is fed, and positioned for sealing onto base web 110 is critical to achieving accurate secure sealing of tape 132, to web 134. To this end, base web 134 is indexed at indexing station 136, via servo motor 138. Servo motor 138 has control over acceleration, speed and deceleration of web 134.

It has been determined that the following sequence of steps rapidly and accurately feed, locate, cut and seal tape 132 onto web 134.

1. A signal to index base web 134 and index tape 132 is given, controlled by the level of take up dancer 140.
2. A servomotor 142 drives the tape 132 forward via the nip drive 144 of the tape drive assembly 146.
3. The leading edge of the tape 132 is driven into the vacuum belt 148 in vacuum drive assembly 150. Vacuum openings 152 in the belt 148 attach to the skirt area 154 above the reclosable fastener assembly 10 on tape 132. The Vacuum belt 148 is driven slightly faster than nip drive roller surfaces 156 and carries the leading edge of the tape 132 to its farthermost position in a stretched manner.
4. After driving the tape 132 the distance desired, the tape cutter assembly 158 is activated to clamp and cut tape 100.
5. As the cutter 158 clears to return to its uppermost position, the leading edge 132A of the next piece of tape 132 is lifted clear of the cutting slot 160 to avoid a potential jam on the next feed cycle and so as to be aimed properly for transference to the vacuum belt 148. Concurrently the cutting ledge 162 moves clear to allow the trailing edge 132B of the tape piece just cut to lay flat for sealing.
6. The tape 132 is sealed to the base web 134 via the sealing bar 164 which is part of sealing assembly 166. The sealing bar 164 clears and the cycle is ready to be repeated. The trailing edge 132B of the piece of tape 132 just attached to the base web 132 does not interfere with the lifted leading edge 132A of the tape 132 on next feed cycle due to the leading edge 132A feeding over the trailing edge 132B being pulled away in a transverse direction.
7. Vacuum remains on and seal bond strength of tape 132 to base web 134 allows separation of the tape skirt 154 from vacuum belt 148 when the base web 134 indexes. This allows vacuum belt 148 holding strength to remain constant continuously and prevents time delays to build up vacuum strength after being shut down.

Figure 13:
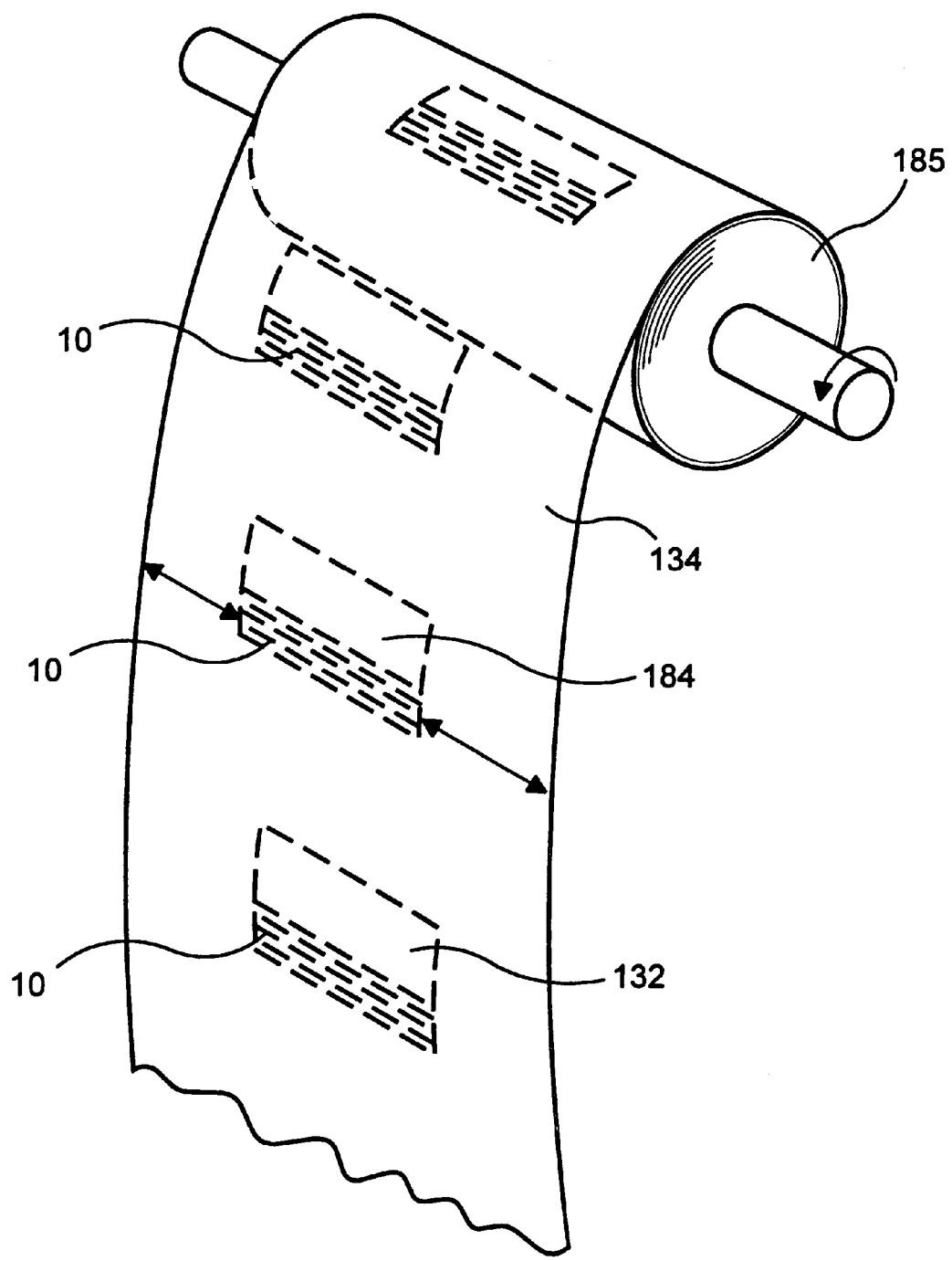
FIG. 13 of the drawings is a roll of bag making material having a series of fastener tapes and reclosable fasteners sealed to the bag making material.

As shown in FIG. 13, another aspect of the invention provides for an attachment of tape 132 to web 134, and then winding the resulting web with sequential fastener assembly 184 onto a roll 185 using a winder (not shown). This allows bagger 172 to function with pre-applied tape. There exists substantial demand for zippered roll stock 186 with tape 132 already sealed onto base web 134 to be run on separate baggers. This approach to zippered packaging is not a replacement for in-line capability, but can be used as another option.

System 120 described above optionally feeds a winder 600 (not shown), as well as bagger 172 with, practically, no modifications. In these cases, the packer or the converter could be the user of the equipment. This approach allows any converter to provide a customer-packer with preapplied zippered roll stock 186 enabling the converter to obtain base web business he would not ordinarily get. The packer runs preapplied zippered roll stock 186 for multiple baggers 172 without having to provide tape applicator.

Figure 11:
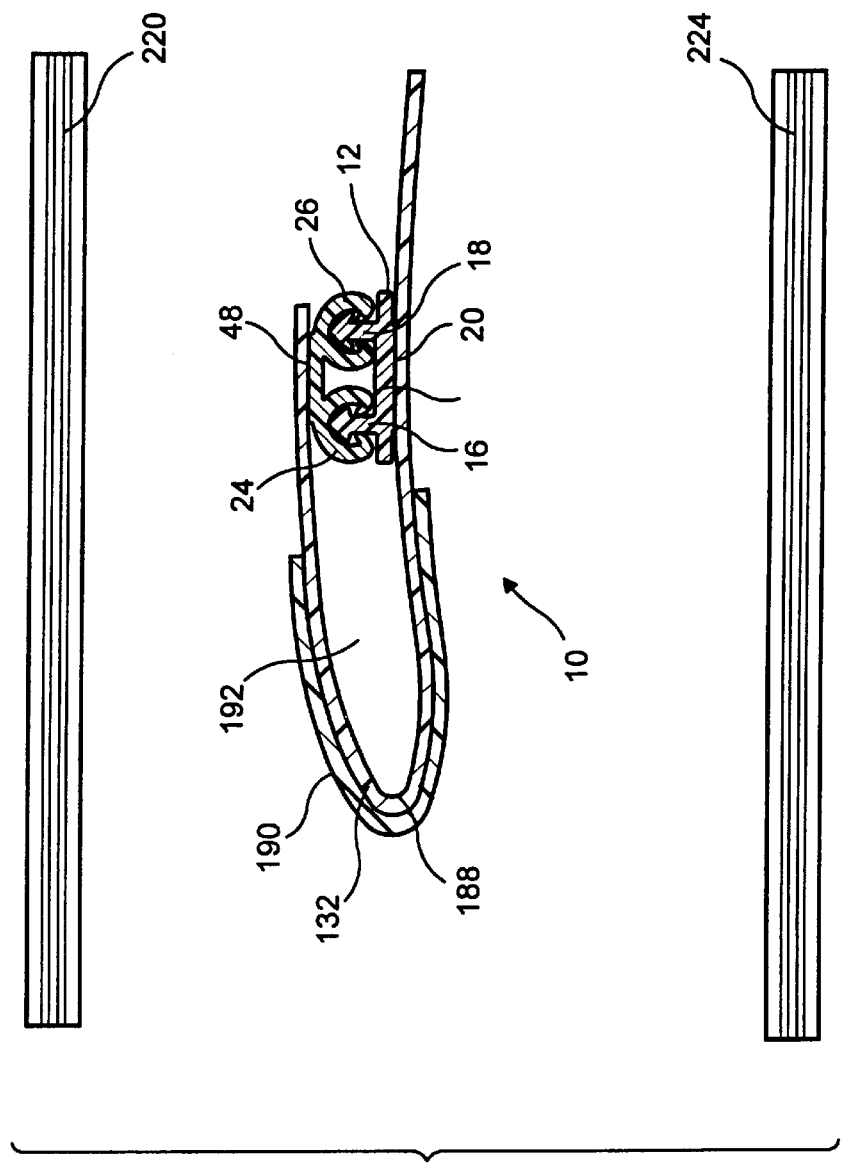
FIG. 11 of the drawings is a vertical section of the reclosable fastener of the present invention sealed to fastener tape for attachment to a bag wall.
Figure 12:
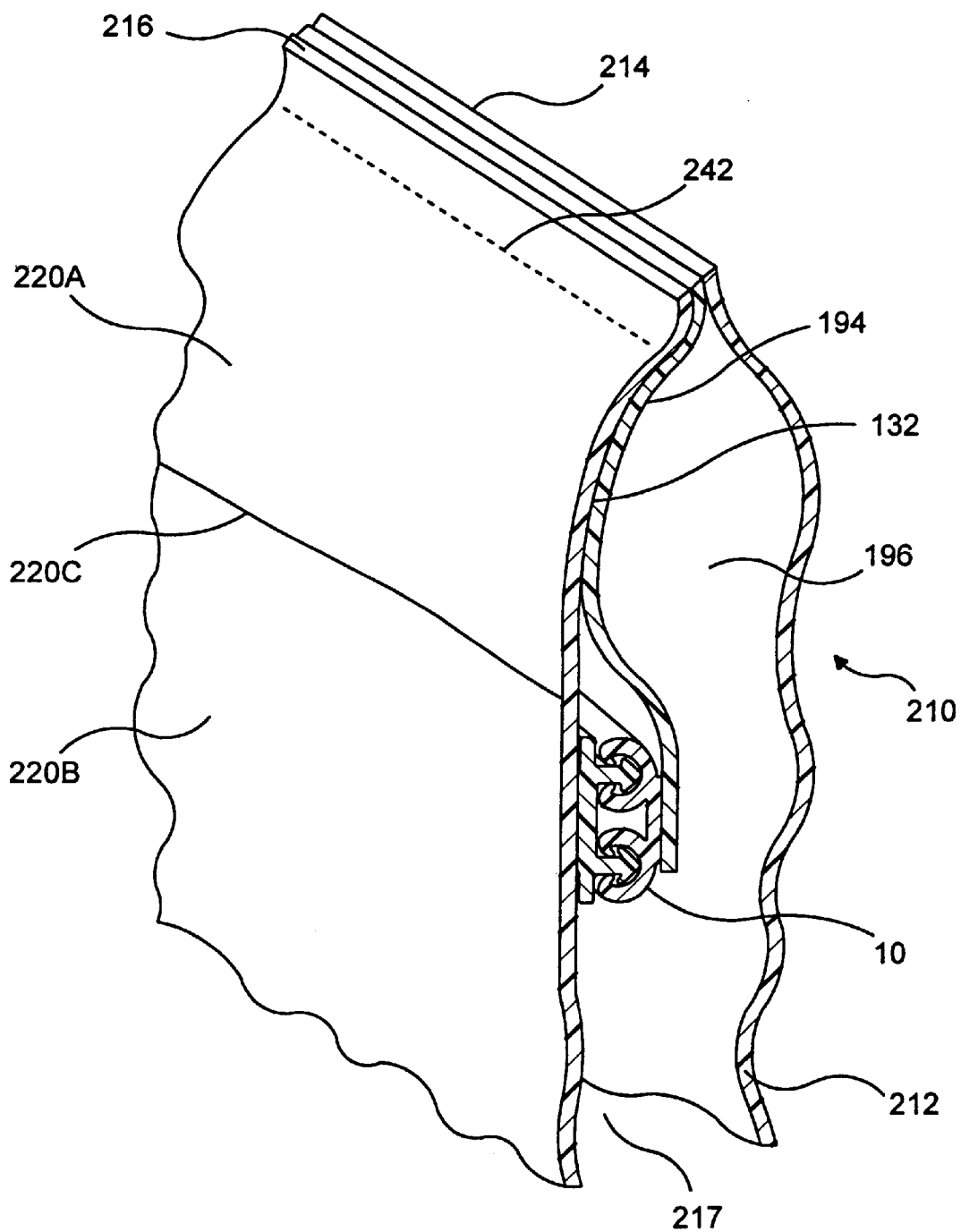
FIG. 12 of the drawings is the reclosable fastener and tape of FIG. 11 shown sealed within the top of the bag of FIG. 10.

As shown in FIG. 11, the invention also provides for methods of treating the internal loop or flap area 188 of tape 132 to create a non-sealing characteristic thereof as illustrated in FIG. 12. The inside surface of the loop or flap area 188 of the tape 132 material is treated to make it not seal in bagger 172 during the jaw sealing process. There are several ways in which this is accomplished, including electronic surface (corona-style) treatment, non-sealable printing materials application, laminated, or sealed barrier (non-sealable) strip application onto tape 132 material between first closure element 12 and insertion of barrier (non-sealable) strip 190 into loop (flap) area 192.

As illustrated in FIG. 12, the invention includes a tape 132 for attachment to a web. The tape 132 includes a fastener compatible inside portion 194 for connection to fastener 10 and an outside portion 196 compatible with sealant layer 198 of packaging material 200 for connection of outside portion 196 to sealant layer 198. In one variant the fastener compatible inside portion 194 and the outside portion 196 are incompatible. The zipper compatible inside portion 194 is compatible with low density polyethylene. The inside loop surface 202 is treated so as to be incompatible, i.e. virtually non-sealable during the sealing process.

In a variant, a simplified method of manufacturing the tape 204 described above is provided that includes the step of coextruding a first base tape 206 material to obtain fastener compatible inside surface portion 194 and a second base tape 208 material to obtain outside surface portion 196. Optionally, the method includes the step of fusing the fastener compatible inside portion 194 to the outside portion 196 to obtain a laminate structure.

FIG. 10 illustrates reclosable plastic bag 210 of the present invention. Reclosable plastic bag 210 includes a top end generally indicated by numeral 214 and a bottom end indicated by numeral 216. Bag 210 has a front wall 220, a back wall 224, and a seal 216 at top end 214 at which interlocking fastener profile lip 232 is sealed to front wall 220 and sealed to back wall 224. The tri-laminate structure at top end 214 of walls 220 and 224 and lip 232 increases the strength of top end 214 producing increased tear resistance at this portion of the bag during the manufacturing process and also when the bag is displayed at a retailer. Top end 214 optionally contains an aperture 234 that extends through walls 220 and 224, and tape 232 that is used to hang reclosable plastic bag 210 on hooks in retail stores. Bag 210 also has seal 218 at bottom end 216 at which front wall 220 and back wall 224 is connected.

FIG. 12 illustrates an exploded cross section of the top portion of a reclosable bag 210. Reclosable bag 210 has a bag body 212 with bag top end 214 top seal 216 and bottom end 217. Bag 210 has bottom seal 218 and back seal 220, and confronting bag walls 220 and 224. Reclosable bag 210 includes fastener tape assembly 132 sealed to confronting bag walls 220 and 224 at seals 226 and 228. Reclosable bag 210 optionally includes indicia 230 indicating where bag 210 should be cut to provide a user access to interlocked fastener assembly 132. It is appreciated that bag 210 can be used in many applications including, but not limited to, snack bag applications.

Figure 9:
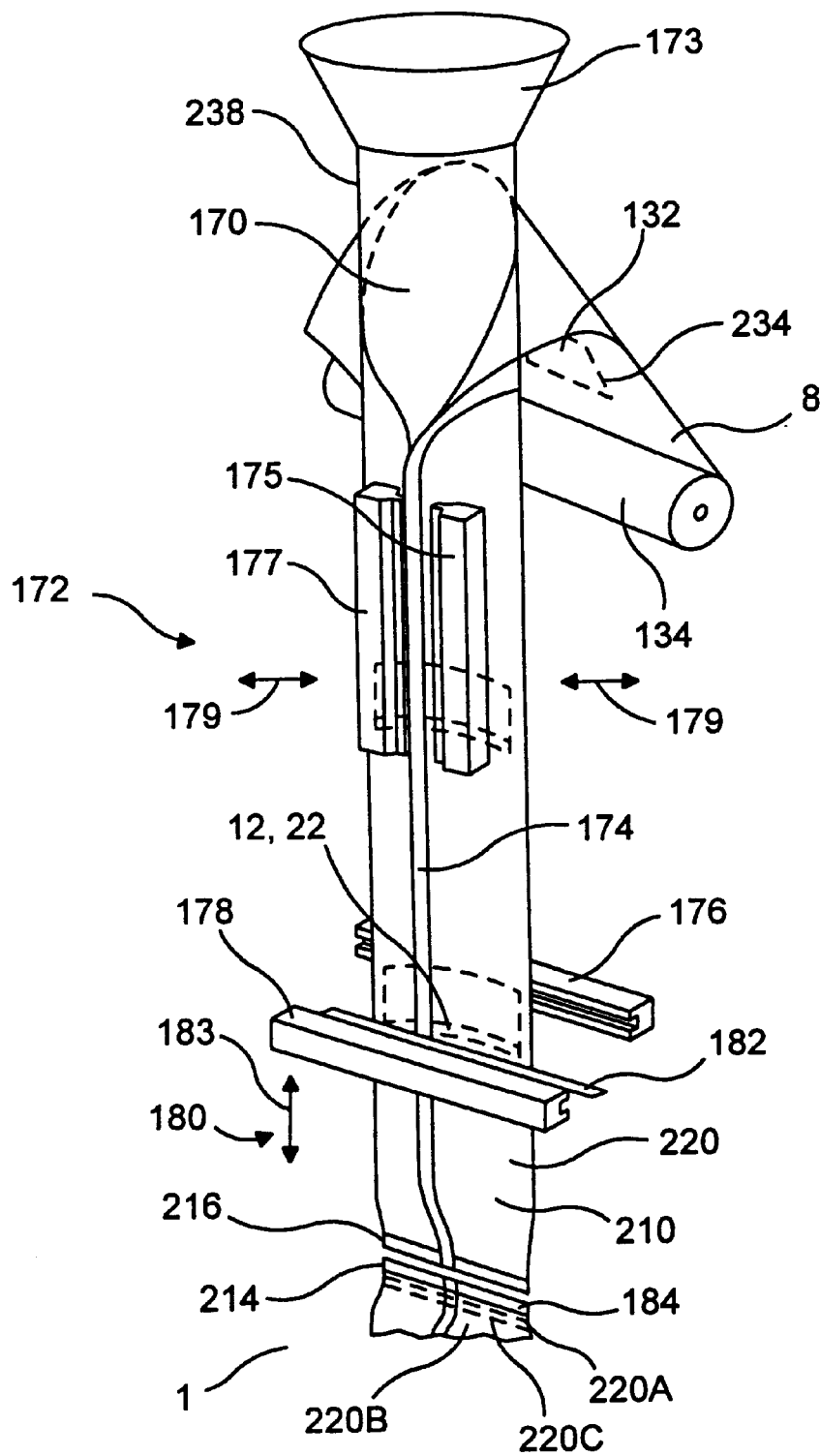
FIG. 9 of the drawings is a front perspective view of a form fill seal machine utilizing bag making material having the reclosable fastener of the present invention thereon.

Multiple bags 1, as illustrated in FIG. 9 are manufactured by supplying web material 134, whether single ply or laminated to a form, fill and seal machine 172. Such machines are known in the art and include a combination bag forming and filling nozzle cylinder or tube 170 adapted to receive products to be filled into the formed bags from a hopper 173. Bag making web 134 has thereon complementary first and second closure members 12 and 22 sealed to tape 132 that will become the front walls 220 of bags 210 in the manufacturing process. The first closure member 12 is releasably interlocked to second closure member 22 before tape 132 is sealed to wall 220 at appropriate intervals. At this juncture, side 234 of lip 132 is not joined to wall 220. Web 134 is guided around the cylinder outer surface 238 of cylinder 170.

The longitudinal margins of web 134 are brought together into a longitudinal assembly which is sealed to form closure seam on back seal 174. Closure seam 174 is formed by vertical sealing bars 175 and 177 which move inward as indicated by numeral 179. Bars 175 and 177 then separate to release the heat sealed seam 174 of the closed bag forming tube of web material 134. Closed bag forming tube of web material 134 is advanced by means of a pair of horizontal, parallel bag end sealing bars 176 and 178 that reciprocate to clamp the bag web tube 134 below the end of the cylindrical forming and filling member 172 and simultaneously seal the top end 214 of a filled bag section and the bottom end 216 of a succeeding bag section.

It is appreciated that sealing bars 176 and 178 simultaneously seal front wall 220 to end lip 232 and to back wall 210 in a single step, (best seen in FIG. 12). Then sealing bars 176 and 178 still gripping the bag web tube 134 move downwardly a bag section length as indicated by directional arrow 180 to pull and advance the entire bag making tube one bag length. As this step occurs, the next succeeding bag is filled with product dropped down cylinder 170 from hopper 173. As bags are sealed and pulled down, a cut off bar 182 cuts midway across seal 184, thus releasing the previously filled bags which are handled as desired. Having completed its downward stroke, cut off 182 returns to its starting position as indicated by arrow 183.

Bag 210 is airtight prior to the separation of upper portion 220A of front wall 220 from lower portion 220B of front wall 220 to gain access to reclosable fastener assembly 10. Generally, a user will manually separate upper portion 220A from lower portion 220B manually at score, rupture line or perforation 220C. Separation of portions 220A and 220B will open up the interior 240 of bag 210 to the environment, but only up to fastener assembly 10. Fastener assembly 10 is then manipulated to open the entire bag 210 to the environment. Optionally, upper portion 220A of wall 220 is scored to form a flap that includes three score lines, e.g. score line 242 and two score lines perpendicular thereto that start at score line 242 and terminate at seal 246 (not shown). The flap includes upper portion of wall 220 and is pivotally connected to bag 210 at seal 246. It is appreciated that provision of this flap allows for ease of access to fastener assembly 10.

As illustrated in FIG. 12, web 134 includes a multiplicity of flexible interlocking fastener lips 232 which are free of connection to web 134. That is, lips 232 simply rest on each respective section 244 of web 134 at this juncture. Each lip 232 is permanently connected to a fastener assembly 10, is integral therewith, or optionally can be releasably attached thereto. Each fastener assembly 10 includes a first closure member 12 releasably connected to a complimentary second closure member 22. The web 134 or bag film of the present invention is commonly referred to as plastic film and includes polymeric materials as are known in the art. It is appreciated that sealing or connecting only tape 132 to web 134 prior to formation of bag 210 or utilization of web 134 with apparatus 172 greatly simplifies and facilitates that manufacturing process. Sealing of lip 232 to front wall 220 during the formation of bag 210 provides numerous advantages in the manufacturing process including, by way of example, faster web feed times and the like.

As a result of the foregoing improved fastener assembly and fastener tape assembly, manufacture of reclosable plastic bags superior to the prior art at higher speeds and with improved reliability is provided.

I claims:

1. A reclosable fastener assembly for bag making material, said fastener comprising:

a first closure element comprising a base member, a first male profile extending substantially perpendicularly from said base member and a second male profile extending substantially perpendicularly from said base and substantially parallel to said first male profile said base member further comprising a sealing bridge section extending between said first and second male profiles, said bridge section being thicker than marginal portions of said base, said increased thickness extending in a direction opposite to said first and second male profiles;

a second closure element, said closure element comprising a pair of substantially u-shaped members, said u-shaped members each defining a channel portion constructed and arranged for selective interlocking with said first and second male profiles;

a second sealing bridge extending between said u-shaped members, said second sealing bridge being substantially as thick as said first sealing bridge;

said first and second male members and said u-shaped members further being constructed and arranged, sized and positioned for supporting, when interlocked, said sealing bridge sections in parallel to each other so as to provide a flat surface for sealing of said fastener assembly to said bag making material.

2. The reclosable fastener assembly of claim 1 wherein said thickened sealing bridge section of said first closure element is approximately 0.060 inches in width and 0.010 inches in thickness ±0.003 inches.

3. The reclosable fastener assembly of claim 1 wherein said thickened sealing bridge section of said second closure element is approximately 0.060 inches in width and 0.010 inches in thickness ±0.003 inches.

4. The reclosable fastener assembly of claim 1 wherein said first male profile and said second male profile extend approximately 0.047 inches from the outside of said base member ±0.003 inches and said first and second male members are approximately 0.066 inches ±0.003 inches separate from each other, taken along the central axis of each of said male members.

5. The reclosable fastener assembly of claim 1 wherein said substantially u-shaped members on said second closure element are approximately 0.046 inches ±0.003 in height from the outside of said base member and are separated by a distance of approximately 0.067 inches ±0.003, taken along the central axis of each of said u-shaped members.

6. The reclosable fastener elements of claim 1 wherein said first closure element and said second closure element are approximately 0.120 inches in width when used on thin film, 0.124 inches in width when used on intermediate thickness bag making material and 0.128 inches in width when used on heavier bag making material.

7. The reclosable fastener assembly of claim 1 wherein said first closure element and said second closure element, when interlocked, form a substantially rectangular strip in cross-section which may be easily guided through bag making equipment.

8. The reclosable fastener assembly of claim 1 wherein said u-shaped members of the second closure element comprise curved lateral edges constructed and arranged, sized and positioned for facilitating guidance of said second closure element through bag making equipment.

9. The reclosable fastener assembly of claim 1 wherein said thickened sealing bridge is constructed and arranged for flexibility during opening and closing of said reclosable bags, but is sufficiently rigid to permit and facilitate sealing of said thickened sealing bridge to said bag making material during bag manufacturing.

10. The reclosable fastener assembly of claim 1 wherein said male profiles are constructed and arranged for sufficient rigidity to maintain interlocking with said u-shaped closures, while at the same time being sufficiently flexible for selectively opening of said fastener assembly, as desired.

11. The reclosable fastener assembly of claim 1 wherein said u-shaped members are constructed and arranged for rigidity in maintaining said fastener assembly in an interlocked configuration, while at the same time being sufficiently flexible to allow selective opening of said fastener assembly, as required.

12. The reclosable fastener assembly of claim 1 wherein said male profile members are approximately 0.014 inches in width ±0.003.

13. The reclosable fastener profile of claim 1 wherein said u-shaped members are approximately each 0.054 inches ±0.003 in width and have an interior diameter of approximately 0.015 inches ±0.003.

14. The reclosable fastener assembly of claim 1 wherein said first and second male profiles include at the ends thereof product side and consumer side barbs and said barbs on said first male profile and said second male profile are constructed and arranged with said product side barbs being longer than said consumer side barbs to provide increased resistance to opening on the product side of said fastener assembly when sealed on said bag making materials and interlocked in a bag.

15. The reclosable fastener assembly of claim 1 wherein said second male profile and said second u-shaped member serve as a secondary interlock when said first male profile and said first u-shaped member have been separated, thereby preventing inadvertent opening of said fastener assembly.

16. The reclosable fastener assembly of claim 1 wherein said first male profile and said first u-shaped member serve as a secondary interlock when said second male member and said second u-shaped member have been separated, thereby preventing inadvertent opening of said reclosable fastener assembly when used in reclosable bags made from said bag making material.

17. A reclosable fastener assembly for bag making material, said fastener assembly comprising:

a first closure element, said first closure element comprising a base member; a first male profile extending substantially perpendicularly from said base member and a second male profile extending substantially perpendiculalary from said base member and substantially parallel to said first male profile; said base member further comprising a sealing bridge section extending between said first and second male profiles, said bridge section being thicker than marginal portions of said base, said increased thickness extending in a direction opposite to said first and second male profiles;

a second closure element, said second closure element comprising a pair of substantially u-shaped members, a first one of said u-shaped members defining a first channel portion, a first leg portion and a second leg portion;

said first leg portion having a first hook member attached to and extending inwardly therefrom;

said second leg portion having a second hook member attached to and extending inwardly therefrom;

a second one of said u-shaped members comprising a second channel portion, a third leg portion and a fourth leg portion, a third hook member extending inwardly from said third leg member and a fourth hook member extending inwardly from said fourth leg member, said first and second hook members and said first and second leg members being constructed and arranged, sized and positioned for telescope reception of and selective retention of said first male member;

said third and fourth hook members and said third and fourth leg members being constructed and arranged, sized and positioned for telescope reception of and selective retention of said second male member;

a second sealing bridge extending between said first and second u-shaped members said second sealing bridge being substantially as thick as said first sealing bridge and;

said first and second male members and said u-shaped members further being constructed and arranged, sized and positioned for supporting when interlocked with said first and second u-shaped members, said sealing bridge sections in parallel to each other, thereby facilitating sealing of said fastener assembly to said bag making material.

18. The reclosable fastener assembly of claim 17 wherein said first male profile comprises a barb member integrally formed thereon proximate the distal end of said male profile;

said first closure element further comprising a second barb member integrally formed on the distal end of said second male profile;

said first and second barb members being constructed and arranged, sized and positioned for selective interlocking with said u-shaped closure members.

19. The reclosable fastener assembly of claim 18 wherein said first barb member has first and second prong members extending substantially laterally therefrom adaptive for interlocking with said first and second hook members and said second barb member has third and fourth prongs extending laterally therefrom adaptive for selective interlocking with said third and fourth hook members on said second u-shaped member.

20. The reclosable fastener assembly of claim 19 wherein said third and fourth prong members are larger than said first and second prong members whereby said second male member, when interlocked with said second u-shaped member, is more difficult to separate from said second u-shaped member than said first male member when interlocked with said second u-shaped member.

* * * * *